No. 662,384. Patented Nov. 27, 1900.
A. B. ARMSTRONG.
STOCK FEEDER.
(Application filed Apr. 6, 1900.)
(No Model.)
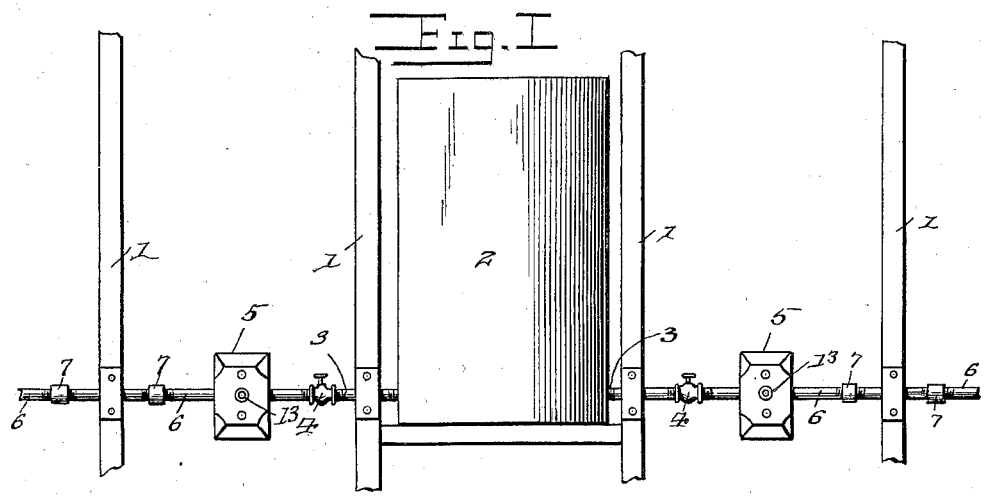
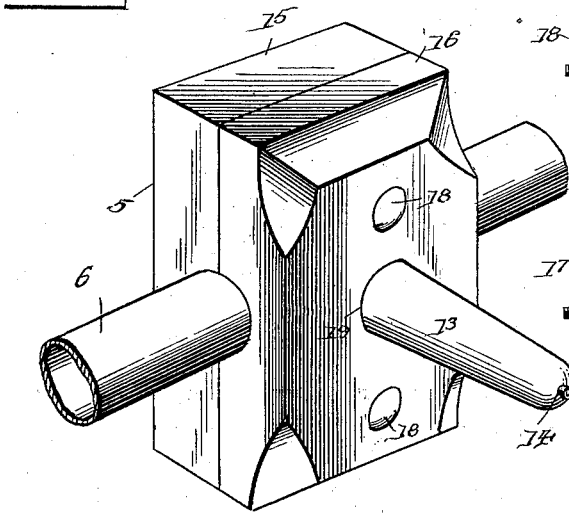
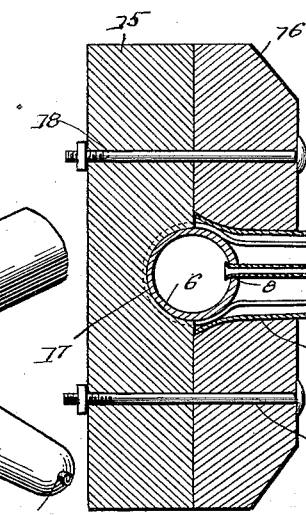
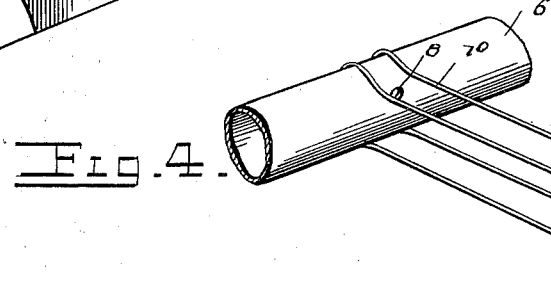
Witnesses
F. E. Alden.
A. B. Armstrong Inventor
By his Attorneys,
C. A. Snow & Co.

UNITED STATES PATENT OFFICE.

ADELBERT B. ARMSTRONG, OF EAST OTTO, NEW YORK.

STOCK-FEEDER.

SPECIFICATION forming part of Letters Patent No. 662,384, dated November 27, 1900.

Application filed April 6, 1900. Serial No. 11,871. (No model.)

*To all whom it may concern:*

Be it known that I, ADELBERT B. ARMSTRONG, a citizen of the United States, residing at East Otto, in the county of Cattaraugus and State of New York, have invented a new and useful Stock-Feeder, of which the following is a specification.

This invention relates to stock-feeders, and has for its object to provide improved means for administering liquid food to calves, so that they may suck the milk through a nipple or teat in imitation of the natural manner and to guard against loss of the milk after the animal has finished feeding. It is furthermore designed to provide a device of this character which may be conveniently set up in a barn or in a cattle-car, so as to effectually feed a plurality of animals at a single time and from a single tank containing the food.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a front elevation showing the application of the present invention. Fig. 2 is a detail perspective view of one of the individual feeders. Fig. 3 is a longitudinal sectional view thereof. Fig. 4 is a detail perspective view of the valve or clamp for automatically stopping the flow of milk after the animal has finished feeding.

Corresponding parts in the several figures of the drawings are designated by like characters of reference.

Referring to the drawings, 1 designates a plurality of uprights or the studding of a barn or cattle-car, between two of which uprights is supported a feed-tank 2 for containing the milk or other liquid food to be administered to the animals. Branching out from the tank and supported by the studding is a plurality of feed-pipes 3, here shown as two extending in opposite directions and provided with the globe-valves 4 to control the outflow from the tank. It will be understood that when the tank is not located adjacent to a wall a great number of branch pipes may be extended radially from the tank, so as to accommodate a much greater number of animals. At suitable intervals throughout the length of the feed-pipes are provided the feeding devices proper, 5, each of which is connected to a section of pipe 6, which is screw-threaded at opposite ends, so as to be detachably connected to the adjacent section by means of a suitable collar or coupling 7. By this arrangement each feeder may be replaced when damaged and also may be turned toward the wall when not in use, so as to be protected, as will be hereinafter explained.

Each feeding device comprises a pipe-section 6, which is provided with an intermediate perforation or opening 8, that is located at the outer side of the pipe and is designed to receive the inner end of a rubber or other suitably-flexible tube 9, which extends radially outward from the pipe and is intended to supply the milk to the animal. Embracing the pipe is a substantially U-shaped clamp 10, that is provided at its outer free extremities with inwardly-directed overlapped jaws, that receive the outer end of the tube 9, so as to normally pinch the latter and thereby cut off the flow of the milk when the feeder is not in use. The clamp is released from the tube by the pressure of the animal's jaws to permit of the free flow of the milk, as will be understood. The clamp is formed by an endless wire, which is originally in the form of an elliptical loop that is bent intermediate of its ends, so as to form a substantially U-shaped clamp, each arm of which is formed by two sections of wire. The free extremity of each arm is provided with a pair of jaws 11 and 12, which are inwardly directed and extend transversely across the arm. The outer jaw 11 is formed by bending inwardly the transverse outer portion of the arm, and the inner jaw is formed by a transverse loop bent in one of the sections of the arm. As best indicated in Fig. 3, the U-shaped clamp snugly embraces the pipe-section 6, so as to receive the tube 9 between the opposite spring-arms, and the loop-shaped jaws are alternately arranged, so that when the arms are pressed inwardly the outer end of the tube may be passed through the alined jaws, and when the arms are released they will spring outwardly to resume their normal position, whereby the jaws will pinch the tube and prevent the outflow of milk. To protect the tube and the spring-clamp, the latter is incased within a flexible teat or nipple 13, which is provided at its outer closed end with a perforation 14, through which the outer end of the tube 9 is designed to normally project, so that no milk may enter the nipple to interfere with the operation of the clamp. The nipple is connected to the pipe-section by means of a clamp comprising two blocks 15 and 16, each of which is provided with a semitubular groove 17 in its inner face to receive the pipe-section 6, and the blocks are clamped thereon by means of the bolts 18. The outer block is provided with a central opening 19 for the reception of the tube, the spring-clamp, and the nipple, the inner open end of the latter being connected to the walls of the opening in the outer block in any suitable manner.

In the operation of the device the animal receives one of the nipples in its mouth and by the pressure of its jaws the spring-clamp is released from the tube, whereby the milk is free to flow into the mouth of the animal without requiring a sucking action, although the latter will not interfere with the flow of the milk, as the arms of the clamp prevent the nipple and the tube from being collapsed. It will be understood that the feed-pipes are connected at or adjacent to the bottom of the tank and are also inclined slightly downwardly, so as to insure a free flow of the liquid food and thereby insure an adequate supply to the animal. By reason of the threaded couplings at opposite ends of the pipe-sections each feeder may be turned toward the wall when not in use, so as to protect the nipple and the contents thereof. To cleanse the device, it is merely necessary to place water in the tank and press the nipples so as to open the tubes, whereby the water will flow through the pipes and the tubes.

In order that the teat or nipple may be strong and durable to withstand the friction of the teeth of the animals, I prefer to form the nipples from the scrotum of a calf, which scrotum is tanned and stretched over a suitable frame to give it the required shape of a nipple.

What is claimed is—

1. A stock-feeder, comprising a tank, a feed-pipe connected therewith and formed by independently-rotatable sections, lateral tubes carried by the sections, means for normally closing said tubes, and nipples inclosing the respective tubes.

2. A stock-feeding device, comprising a tank, a feed-pipe connected thereto, said pipe being formed by a plurality of sections, which are independently rotatable, each section also having an intermediate perforation, a tube or nipple in communication therewith, a clamp comprising a pair of blocks embracing the pipe, and one of the blocks having an opening to receive and support the tube or nipple, and means for normally closing the nipples.

3. In a stock-feeding device, a tank, a nipple, a flexible tube within the nipple and in communication therewith, and a spring-clamp, having jaws normally pinching the tube, and also movable inwardly in opposite directions to release the tube.

4. In a stock-feeding device, a tank, a nipple, a flexible tube within the nipple and in communication with the tank, and a spring-clamp, comprising opposite arms having an outward tension in opposite directions, and also inwardly-directed loop-shaped jaws receiving the tube and normally pinching the latter, said arms being movable inwardly in opposite directions to release the tube.

5. In a stock-feeding device, a tank, a pipe in communication therewith, and having a perforation, a nipple, a flexible tube within the nipple and having one end fitted in the perforation, and a substantially U-shaped spring-clamp embracing the pipe, and having opposite jaws normally pinching the tube, and also movable inwardly in opposite directions to release the tube.

6. In a stock-feeding device, a tank, a pipe in communication therewith and provided with a perforation, a nipple, a flexible tube within the nipple and having one end fitted in the perforation, and a substantially U-shaped spring-clamp embracing the pipe, and having opposite normally-overlapped loop-shaped jaws, which receive and pinch the tube, and are movable in opposite directions to release the tube.

7. In a stock-feeder, a tank, a pipe in communication therewith and provided with a perforation, a nipple, a flexible tube within the nipple and having one end fitted in the perforation in the pipe, and a spring-clamp formed from a loop-shaped wire bent intermediate of its ends into a substantially U-shaped clamp embracing the tube, the free extremity of each arm of the clamp being bent into a pair of inwardly-directed transverse loop-shaped jaws, the jaws of the opposite arms being arranged to respectively overlap each other and also pinch the tube from opposite sides, and the arms being movable inwardly in opposite directions to release the tube.

8. In a stock-feeding device, a tank, a feed-pipe in communication therewith and provided with a perforation, a flexible tube having one end fitted in the perforation, a substantially U-shaped clamp embracing the pipe, and having jaws normally pinching the tube and movable in opposite directions to release the tube, a teat or nipple inclosing the tube and the clamp, and opposite blocks, having semitubular grooves to receive the pipe, and bolts connecting the blocks, one of the latter having an opening to receive the tube and the clamp, and the inner end of the teat or nipple being secured to the walls of the opening.

9. A stock-feeder, having a nipple, provided with a tube, and a clamp, having opposite jaws normally closing communication through the tube, and said jaws being movable inwardly in opposite directions, to open communication through the tube.

10. A stock-feeder, having a nipple, provided with a flexible tube, and a clamp, having opposite jaws normally pinching the tube to close communication therethrough, and said jaws being movable inwardly in opposite directions to release the tube and open communication therethrough.

In testimony that I claim the foregoing as my own I have hereto affixed my signature in the presence of two witnesses.

ADELBERT B. ARMSTRONG.

Witnesses:
MILTON W. ARMSTRONG,
SYLVESTER C. SPAULDING.